United States Patent Office 3,219,700
Patented Nov. 23, 1965

3,219,700
METHOD OF PREPARING HYDROXY-
BENZYLAMINES
Francis X. O'Shea, Wolcott, and Frank B. Root, Water-
bury, Conn., assignors to United States Rubber Com-
pany, New York, N.Y., a corporation of New Jersey
No Drawing. Filed Aug. 1, 1963, Ser. No. 299,165
7 Claims. (Cl. 260—569)

This invention is concerned with a novel method for preparing compounds of the general formula:

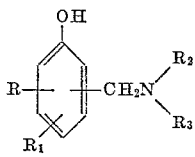

wherein R and $R_1$ are alkyl, cycloalkyl or aralkyl groups of up to 12 carbon atoms each and $R_2$ and $R_3$ are selected from the group consisting of —H, —OH, —$NR_4R_5$ (in which $R_4$ and $R_5$ may be hydrogen, alkyl, cycloalkyl, aralkyl or aryl of up to 12 carbon atoms), hydrocarbon groups such as alkyl, hydroxyalkyl, cycloalkyl, aralkyl or aryl groups of up to 12 carbon atoms, and the group:

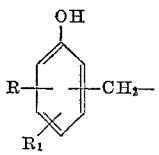

in which R and $R_1$ are as previously defined.

This method involves the reaction of one molar equivalent of a compound of the general formula:

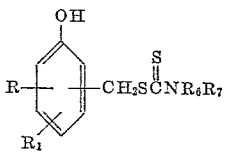

wherein R and $R_1$ are as previously defined and $R_6$ and $R_7$ are lower alkyl groups of one to five carbon atoms each with one molar equivalent of an alkali metal hydroxide and either (a) at least one molar equivalent of an amine of the formula $R_2R_3NH$ in which $R_2$ and $R_3$ are as previously defined or (b) 0.5 molar equivalent of an amine of the formula $R_2NH_2$ in which $R_2$ is as previously defined.

In U.S. Patent 2,363,134 (Nov. 21, 1944), R. F. Mc-Cleary described compounds of the general formula:

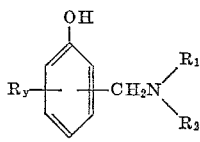

wherein R may be hydrogen, alkyl, aryl, aralkyl, cycloalkyl or naphthenyl radicals, Y may be 1–4, and $R_1$ and $R_2$ may be alkyl, cycloalkyl, aralkyl or naphthenyl radicals. The compounds, useful as lubricating oil additives were prepared by the well-known Mannich reaction involving the reaction of a substituted phenol with formaldehyde and an appropriate amine.

In U.S. Patent 2,802,810 (Aug. 13, 1957), J. C. Bill described compounds of the general formula:

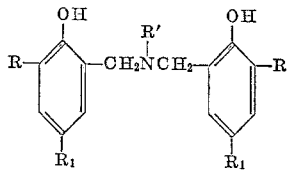

wherein R and $R_1$ are alkyl groups and R' is alkyl, alkenyl, cycloalkyl or hydroxy alkyl. These compounds were also prepared by the Mannich type procedure.

In U.S. Patent 3,043,774 (July 10, 1962), T. H. Coffield described compounds of the general formula:

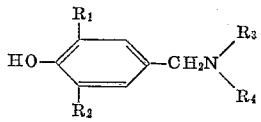

wherein $R_1$ is an alkyl group containing from 1 to 12 carbon atoms, $R_2$ is an alkyl group containing from 3 to 12 carbon atoms which is branched on the alpha carbon atom, $R_3$ is selected from the group consisting of alkyl, cycloalkyl, aralkyl, aryl, alkaryl and the group:

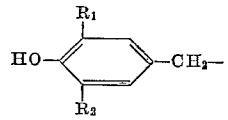

and $R_4$ is selected from the group consisting of hydrogen, alkyl, cycloalkyl, aralkyl, aryl and alkaryl. These compounds, useful as antioxidants, were also prepared by the Mannich reaction.

This invention differs from the prior art in the following ways:

(1) The method of the invention is novel. It has not been previously described.

(2) The method of the invention has an advantage over the Mannich reaction in the preparation of the compounds herein described in that it is broader in scope. F. F. Blicke (Adams, "Organic Reactions," vol. I, John Wiley and Sons, New York, 1942, p. 312) has stated in his review of the Mannich reaction that hydrazine fails to react and that aniline reacts only in certain instances. Thus aromatic amines, hydrazines and hydroxylamine were not mentioned in the patents of McCleary and Bill. Coffield mentions aromatic amines but no yields or physical properties of the products were revealed. In our hands the reaction of 2,6-di-t-butylphenol with formaldehyde and aniline under conditions of the Mannich reaction gave only recovered 2,6-di-t-butylphenol.

On the other hand, the method of this invention is operable with a broad variety of primary and secondary amines including aliphatic amines, aromatic amines, hydrazine, substituted hydrazines and hydroxylamine.

The compounds herein described are prepared by treating one molar equivalent of a compound of the general formula:

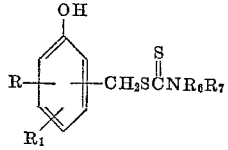

wherein R and $R_1$ are alkyl, cycloalkyl or aralkyl groups of up to 12 carbon atoms each and $R_6$ and $R_7$ are lower alkyl groups of one to five carbon atoms each with one molar equivalent of an alkali metal hydroxide and either (a) at least one molar equivalent of an amine of the formula $R_2R_3NH$ in which $R_2$ and $R_3$ are selected from the group consisting of —H, —OH, —$NR_4R_5$ (in which $R_4$ and $R_5$ may be hydrogen, alkyl, cycloalkyl, aralkyl or aryl), and hydrocarbon groups such as alkyl, hydroxyalkyl, cycloalkyl, aralkyl or aryl groups of up to 12 carbon atoms or (b) 0.5 molar equivalents of an amine of the formula $R_2NH_2$ in which $R_2$ is as defined above.

The equations for these reactions are therefore:

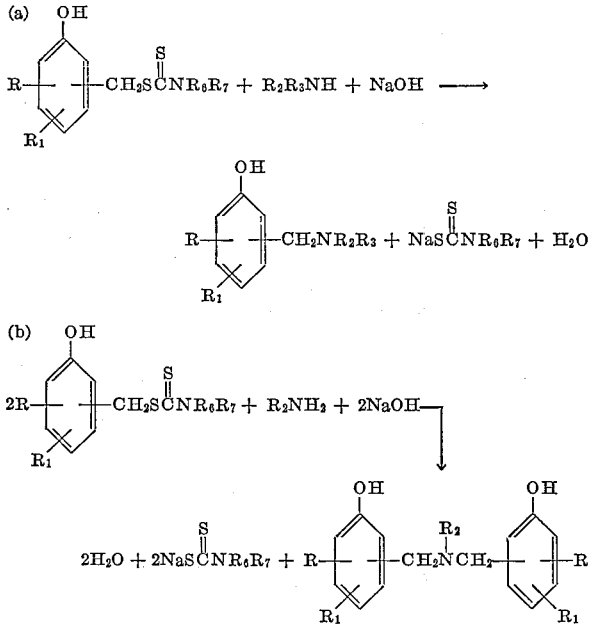

The reaction is generally carried out in an inert liquid medium, usually a suitable water miscible solvent such as methanol, ethanol, isopropanol, dioxane, ethylene glycol dimethyl ether, etc. at a temperature from about room temperature (e.g. 20° C.) to about 100° C. Ordinarily the reaction is carried out at the reflux temperature of the solution. The reaction may also be carried out in a two-phase system such as benzene-water, xylene-water, etc. using good agitation.

The intermediate dialkylhydroxybenzyl N,N-dialkyldithiocarbamates may be prepared by the reaction of the appropriate dialkylphenol with formaldehyde, a dialkylamine and carbon disulfide in a manner similar to that described by A. F. Hardman in U.S. Patent 2,757,174 (July 31, 1956).

The phenols which may be used include 2,6-xylenol,
2-methyl-6-t-butylphenol,
2,6-diisopropylphenol,
2,6-di-t-butylphenol,
2-methyl-6-cyclohexylphenol,
2-methyl-6-t-octylphenol,
2-methyl-6-(alpha-methylbenzyl)phenol,
2-methyl-6-(alpha,alpha-dimethylbenzyl)phenol,
2,4-dimethylphenol,
2-methyl-4-t-butylphenol,
2-t-butyl-4-methylphenol,
2,4-di-t-butylphenol,
2-methyl-4-cyclohexylphenol,
2-cyclohexyl-4-methylphenol,
2,4-dicyclohexylphenol,
2-methyl-4-t-octylphenol,
2-t-octyl-4-methylphenol,
2,4-di-t-octylphenol,
2-nonyl-4-methylphenol,
2-methyl-4-nonylphenol,
2,4-dinonylphenol,
2-methyl-4-(alpha-methylbenzyl)phenol,
2-(alpha-methylbenzyl)-4-methylphenol,
2,4-di-(alpha-methylbenzyl)phenol,
2-methyl-4-(alpha,alpha-dimethylbenzyl)phenol,
2-(alpha,alpha-dimethylbenzyl)-4-methylphenol,
2,4-di-(alpha,alpha-dimethylbenzyl)phenol, etc.

Any dialkylamine may be used in preparing the intermediate but the low molecular weight members are preferable, for example, dimethylamine, diethylamine, diisopropylamine, dibutylamine and diamylamine.

The amines which may be used in the reaction with the intermediate to form the final product include:

(1) Ammonia.
(2) Primary and secondary alkyl amines from methyl- and dimethylamine to dodecyl- and didodecyl amine.
(3) Cycloalkylamines such as cyclohexyl amine and dicyclohexyl amine.
(4) Aralkylamines such as benzylamine and dibenzylamine.
(5) Aromatic amines such as aniline, methylaniline, diphenylamine and phenyl-β-naphthylamine.
(6) Hydroxyalkyl amines such as ethanolamine and diethanolamine.
(7) Hydrazine.
(8) Substituted hydrazines such as methylhydrazine, dimethylhydrazine, didodecyl hydrazine and phenylhydrazine.
(9) Hydroxylamine.

EXAMPLE 1

*Preparation of p-bis(3,5-di-t-butyl-4-hydroxybenzyl)- amino diphenylamine*

3,5 - di-t-butyl-4-hydroxybenzyl N,N - dimethyldithiocarbamate was first prepared as follows:

2,6-di-t-butylphenol (103 g., 0.5 mole), 37% aqueous formaldehyde (40.5 g., 0.5 mole), 25% aqueous dimethylamine (90 g. 0.5 mole), carbon disulfide (40 g., 0.52 mole) and 40 ml. of ethanol were combined in a one-liter, 3-neck flask and heated slowly during 1½ hours to reflux with stirring. The solution was then refluxed for an additional 1½ hours, a precipitate beginning to separate after 30 minutes. The mixture was then cooled and the product was filtered off, washed with ethanol, and dried. The yield of 3,5-di-t-butyl-4-hydroxybenzyl N,N-dimethyldithiocarbamate was 152 g. (90%), M.P. 141–142° C.

To a solution of 9.2 g. (0.05 mole) of p-aminodiphenylamine and 17.5 ml. (0.1 mole) of 6 N sodium hydroxide in 175 ml. of ethanol was added 34 g. (0.1 mole) of 3,5-di-t-butyl-4-hydroxybenzyl N,N-dimethyldithiocarbamate. The solution was heated at reflux for 10 minutes, a precipitate forming. The mixture was cooled and the product was filtered off, washed with ethanol and dried. The yield of p-bis(3,5-di-t-butyl-4-hydroxybenzyl(amino diphenylamine was 22 g. (71%), M.P. 201–203° C.

*Aanalysis.*—Calc'd: Percent N, 4.51. Found: Percent N, 4.40.

EXAMPLE 2

*Preparation of 1,1-dimethyl-2-(3,5-di-t-butyl- 4-hydroxybenzyl)hydrazine*

A mixture of 339 g. (1 mole) of 3,5-di-t-butyl-4-hydroxybenzyl N,N-dimethyldithiocarbamate, 300 g. (5 moles) of dimethylhydrazine and 500 ml. of ethylene glycol dimethyl ether was cooled to 5° C. To this mixture was added 170 ml. (1 mole) of 6 N sodium hydroxide. The temperature rose to 20° C. The mixture was stirred at room temperature for 15 minutes during which solution became complete. To the solution was added 750 ml. of water. The precipitate which separated was filtered off, washed with water and dried. The yield of 1,1-dimethyl-2-(3,5-di-t-butyl-4-hydroxybenzyl)-hydrazine was 236 g. (85%), M.P. 81–83° C. after recrystallization from hexane.

*Aanalysis.*—Calc'd: Percent N, 10.0. Found: Percent N, 9.82.

EXAMPLE 3

*Preparation of N,N-bis(3,5-di-t-butyl-4-hydroxybenzyl)-β-naphthylamine*

To a solution of 7.1 g. (0.05 mole) of β-naphthylamine and 17.5 ml. (0.1 mole) of 6 N NaOH in 250 ml. of ethanol was added 34 g. (0.1 mole) of 3,5-di-t-butyl-4-hydrovybenzyl N,N-dimethyldithiocarbamate. The mixture was heated at reflux for 10 minutes, a precipitate forming. The mixture was cooled and the product was filtered off, washed with ethanol and dried. The yield of N,N - bis(3,5-di-t-butyl-4-hydroxybenzyl)-β-naphthylamine was 19 g. (65%), M.P. 191–192° C.

*Aanalysis.*—Calc'd: Percent N, 2.42. Found: Percent N, 2.48.

EXAMPLE 4

*Preparation of N,N-bis(3-methyl-4-hydroxy-5-t-butylbenzyl)hydroxylamine*

3-methyl-4-hydroxy-5-t-butylbenzyl N,N - dimethyldithiocarbamate was first prepared as follows:

2-methyl-6-t-butylphenol (164 g., 1 mole), 37% aqueous formaldehyde (81 g., 1 mole), 25% aqueous dimethylamine (180 g., 1 mole), carbon disulfide (80 g., 1.05 mole) and 450 ml. of ethanol were combined in a 2-liter, 3-neck flask and heater under reflux with stirring for 3 hours. The product separated as an oil which crystallized when the mixture was cooled. The mixture was filtered and the product was washed with ethanol and dried. The yield of 3-methyl-4-hydroxy-5-t-butylbenzyl N,N-dimethyldithiocarbamate was 251 g. (85%), M.P. 103–105° C.

To a solution of 3.5 g. (0.05 mole) of hydroxylamine hydrochloride and 27 ml. (0.15 mole) of 6 N sodium hydroxide in 100 ml. of ethanol was added 30 g. (0.1 mole) of 3-methyl-4-hydroxy-5-t-butylbenzyl N,N-dimethyldithiocarbamate. The mixture was heated at reflux for 15 minutes, a precipitate forming. The mixture was diluted with 200 ml. of water and the product was filtered off and dried. The yield of N,N-bis(3-methyl-4-hydroxy - 5 - t - butylbenzyl)hydroxylamine was 18.5 g. (96%), M.P. 218–220° C. after recrystallization from ethanol.

EXAMPLE 5

*Preparation of N-methyl-N-(2-hydroxy-3-t-butyl-5-methylbenzyl)aniline*

2-hydroxy - 3-t-butyl-5 - methylbenzyl N,N-dimethyldithiocarbamate was first prepared in the following manner:

A solution of 328 g. (2 moles) of 2-t-butyl-p-cresol, 178 g. (2.2 moles) of 37% aqueous formaldehyde and 396 g. (2.2 moles) of 25% aqueous dimethylamine in 900 ml. of methanol was heated slowly during two hours to reflux and then was refluxed for one hour. The product separated as an oil which crystallized when the reaction mixture was cooled with stirring. The crystalline product was filtered off, washed with aqueous methanol and dried. The weight of 2-t-butyl-4-methyl-6-(dimethylaminomethyl)phenol formed was 398 g. (90%), M.P. 49–51° C.

A portion of the Mannich base weighing 22 g. (0.1 mole) and 8 g. (0.1 mole) of carbon disulfide were dissolved in 40 ml. of ethylene glycol monoethyl ether and heated at reflux for 20 hours. The pot temperature rose from 97° to 118° during this time. The solution was cooled and the product precipitated by dilution of the solution with water. It was filtered off and dried yielding 16 g. (55% of 2-hydroxy-3-t-butyl-5-methylbenzyl N,N-dimethyldithiocarbamate, M.P. 97–98° C.

To a solution of 10.7 g. (0.1 mole) of N-methylaniline and 8 g. (0.1 mole) of 50% sodium hydroxide in 50 ml. of ethanol was added 29.7 g. (0.1 mole) of 2-hydroxy-3-t-butyl-5-methylbenzyl N,N - dimethyldithiocarbamate. The solution was heated at reflux for 30 minutes. On cooling, the product precipitated out. The mixture was diluted with a small amount of water, added dropwise, to aid separation of the product. The product was then filtered off, washed with aqueous ethanol and dried. The yield of N-methyl-N - (2-hydroxy-3-t-butyl-5-methylbenzyl)aniline was 24 g. (85%), M.P. 67–68° C.

EXAMPLE 6

*Preparation of N-methyl-N-[2-hydroxy-3-(alpha,alpha-dimethylbenyl)-5-methylbenzyl]aniline*

To a solution of 5.4 g. (0.05 mole) of N-methylaniline and 4 g. (0.05 mole) of 50% sodium hydroxide in 50 ml. of ethanol was added 18 g. (0.05 mole) of 2-hydroxy-3-(alpha,alpha-dimethylbenzyl) - 5-methylbenzyl, N,N-dimethyldithiocarbamate (prepared in 47% yield from reaction of the corresponding Mannich base with carbon disulfide). The mixture was heated at reflux for 30 minutes. The resulting solution was poured into water and extracted with hexane. The hexane extract was washed with water, dried over anhydrous sodium sulfate and evaporated down to a viscous liquid residue. The yield of N-methyl-N-[2-hydroxy-3 - (alpha,alpha-dimethylbenzyl)-5-methylbenzyl]aniline was 17 g. (98%).

Having thus described our invention, what we claim and desire to protect by Letters Patent is:

1. A method preparing hydroxybenzylamines comprising heating one molar equivalent of a compound of the formula

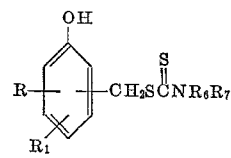

wherein R and $R_1$ are selected from the group consisting of alkyl groups of up to 9 carbon atoms each, cyclohexyl, alpha-methylbenzyl and alpha, alpha-dimethylbenzyl and $R_6$ and $R_7$ are lower alkyl groups of one to five carbon atoms each at a temperature from room temperature to 100° C. with one molar equivalent of an alkali metal hydroxide and a stoichiometric amount of an amine selected from the group consisting of primary and secondary alkyl amines wherein the alkyl groups contain up to 12 carbon atoms each, amomnia, cyclohexylamine, dicyclohexylamine, benzylamine, dibenzylamine, primary and secondary aryl amines in which the aryl groups are selected from the group consisting of phenyl and naphthyl, methylaniline, ethanolamine, diethanolamine, hydrazine, mono- and dialkylhydrazines in which the alkyl groups contain up to 12 carbon atoms each, phenylhydrazine and hydroxylamine.

2. A method of making p-bis(3,5-di-t-butyl-4-hydroxybenzyl)amino diphenylamine comprising heating at a temperature from room temperature to 100° C, one molar equivalent of an alkali metal hydroxide, one molar equivalent of 3,5-di-t-butyl-4-hydroxybenzyl N,N-dimethyldithiocarbamate, and 0.5 molar equivalent of p-aminodiphenylamine.

3. A method of making 1,1-dimethyl-2-(3,5-di-t-butyl-4-hydroxybenzyl) hydrazine comprising heating at a temperature from room temperature to 100° C, one molar equivalent of an alkali metal hydroxide, one molar equivalent of 3,5-di-t-butyl-4-hydroxybenzyl N,N-dimethyldithiocarbamate, and 1 molar equivalent of dimethylhydrazine.

4. A method of making N,N-bis(3,5-di-t-butyl-4-hydroxybenzyl)-beta-naphthylamine comprising heating at a temperature from room temperature to 100° C, one molar equivalent of an alkali metal hydroxide, one molar equivalent of 3,5-di-t-butyl-4-hydroxybenzyl N,N-dimethyldithiocarbamate, and 0.5 molar equivalent of beta-naphthylamine.

5. A method of making N,N-bis(3-methyl-4-hydroxy-5-t-butylbenzyl)-hydroxylamine comprising heating at a temperature from room temperature to 100° C, one molar equivalent of an alkali metal hydroxide, one molar equivalent of 3-methyl-4-hydroxy-5-t-butylbenzyl N,N-dimethyldithiocarbamate, and 0.5 molar equivalent of hydroxylamine.

6. A method of making N-methyl-N-(2-hydroxy-3-t-butyl-5-methylbenzyl)aniline comprising heating at a temperature from room temperature to 100° C., one molar equivalent of an alkali metal hydroxide, one molar equivalent of 2-hydroxy-3-t-butyl-5-methylbenzyl N,N-dimethyldithiocarbamate, and one molar equivalent of N-methylaniline.

7. A method of making N-methyl-N-[2-hydroxy-3-(alpha,alpha - dimethylbenzyl) - 5 - methylbenzyl]aniline comprising heating at a temperature from room temperature to 100° C., one molar equivalent of an alkali metal hydroxide, one molar equivalent of 2-hydroxy-3-(alpha,alpha-dimethylbenzyl)-5-methylbenzyl N,N-dimethyldithiocarbamate, and one molar equivalent of N-methylaniline.

No references cited.

CHARLES B. PARKER, *Primary Examiner.*